(12) United States Patent
Hansing et al.

(10) Patent No.: US 10,439,830 B2
(45) Date of Patent: Oct. 8, 2019

(54) SYSTEM AND METHOD FOR OPERATING A BUS CONFIGURATION WITH A SWITCHABLE CURRENT SOURCE

(71) Applicant: EATON INTELLIGENT POWER LIMITED, Dublin (IE)

(72) Inventors: Matthias Hansing, Bad Honnef (DE); Franz Heller, Sankt Augustin (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/081,933

(22) PCT Filed: Feb. 2, 2017

(86) PCT No.: PCT/EP2017/052249
§ 371 (c)(1),
(2) Date: Sep. 3, 2018

(87) PCT Pub. No.: WO2017/148645
PCT Pub. Date: Sep. 8, 2017

(65) Prior Publication Data
US 2019/0081806 A1    Mar. 14, 2019

(30) Foreign Application Priority Data

Mar. 4, 2016   (DE) .................. 10 2016 103 928

(51) Int. Cl.
*H04L 12/12* (2006.01)
*H04L 12/10* (2006.01)
(Continued)

(52) U.S. Cl.
CPC ............. *H04L 12/12* (2013.01); *H04L 12/10* (2013.01); *H04L 12/40013* (2013.01); *G06F 1/26* (2013.01); *Y02D 50/40* (2018.01)

(58) Field of Classification Search
CPC combination set(s) only.
See application file for complete search history.

(56) References Cited

U.S. PATENT DOCUMENTS 5,266,123 A * 11/1993 Brand ................... B60S 3/04
  134/100.1
8,473,656 B2 * 6/2013 Kuschke ........... H04L 12/40189
  710/110

(Continued)

FOREIGN PATENT DOCUMENTS

EP    2903206 A1    8/2015

*Primary Examiner* — Raymond N Phan
(74) *Attorney, Agent, or Firm* — Leydig, Voit & Mayer, Ltd.

(57) ABSTRACT

A bus arrangement includes: a coordinator; a first subscriber; a second subscriber; and a bus. The bus includes: a first signal line coupling the first subscriber and the coordinator; a second signal line connecting the second subscriber to the first subscriber; and at least one bus line connecting the coordinator to the first subscriber and the second subscriber. The coordinator is configured to send a message via the at least one bus line to the second subscriber with a command to activate the first subscriber via the second signal line. The first subscriber includes a first current sensor and the second subscriber includes a switchable current source. The second signal line couples the first current sensor with the switchable current source.

11 Claims, 6 Drawing Sheets

(51) Int. Cl.
*H04L 12/40* (2006.01)
*G06F 1/26* (2006.01)

(56) References Cited

U.S. PATENT DOCUMENTS

| | | | | |
|---|---|---|---|---|
| 8,874,816 | B2* | 10/2014 | Tailliet | G06F 13/364 |
| | | | | 710/110 |
| 2008/0091862 | A1* | 4/2008 | Hiraka | H04B 10/278 |
| | | | | 710/110 |
| 2009/0185215 | A1* | 7/2009 | Kreppold | G06F 12/0661 |
| | | | | 358/1.15 |
| 2013/0067060 | A1 | 3/2013 | Thaler et al. | |
| 2013/0318267 | A1* | 11/2013 | Chapelle | G06F 13/4291 |
| | | | | 710/110 |
| 2014/0052863 | A1* | 2/2014 | Hart | H04L 67/12 |
| | | | | 709/226 |
| 2014/0208132 | A1 | 7/2014 | Cheston et al. | |
| 2015/0281020 | A1 | 10/2015 | Yun et al. | |
| 2016/0103773 | A1* | 4/2016 | Sauer | G06F 13/16 |
| | | | | 710/110 |
| 2017/0046292 | A1* | 2/2017 | Teuke | G06F 12/0646 |

\* cited by examiner

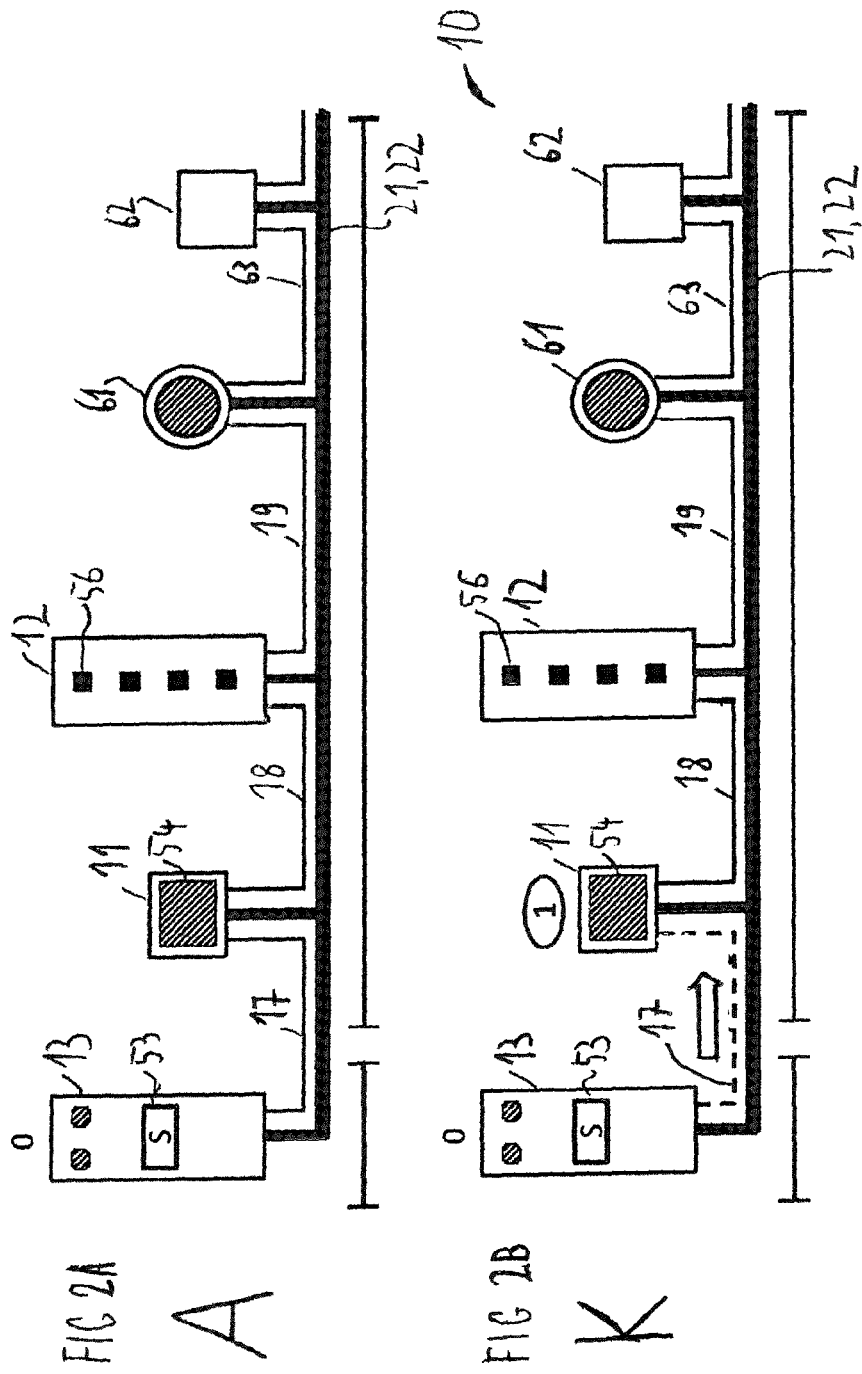

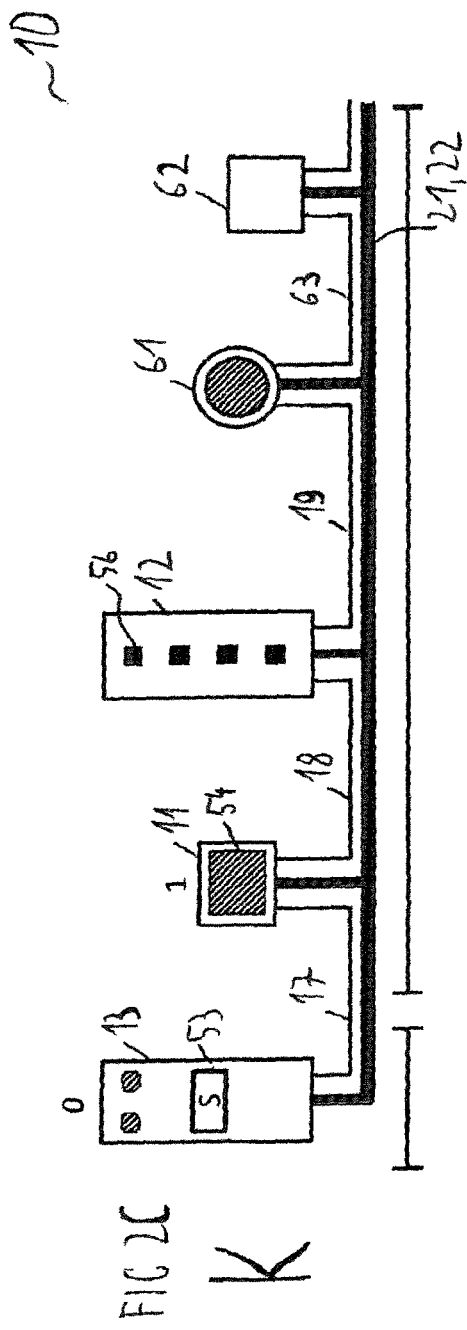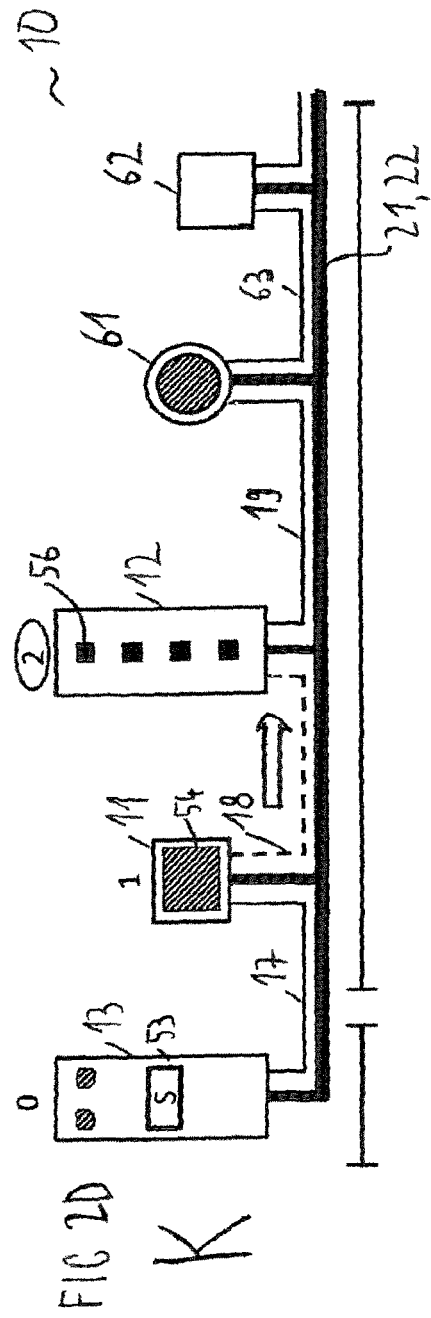

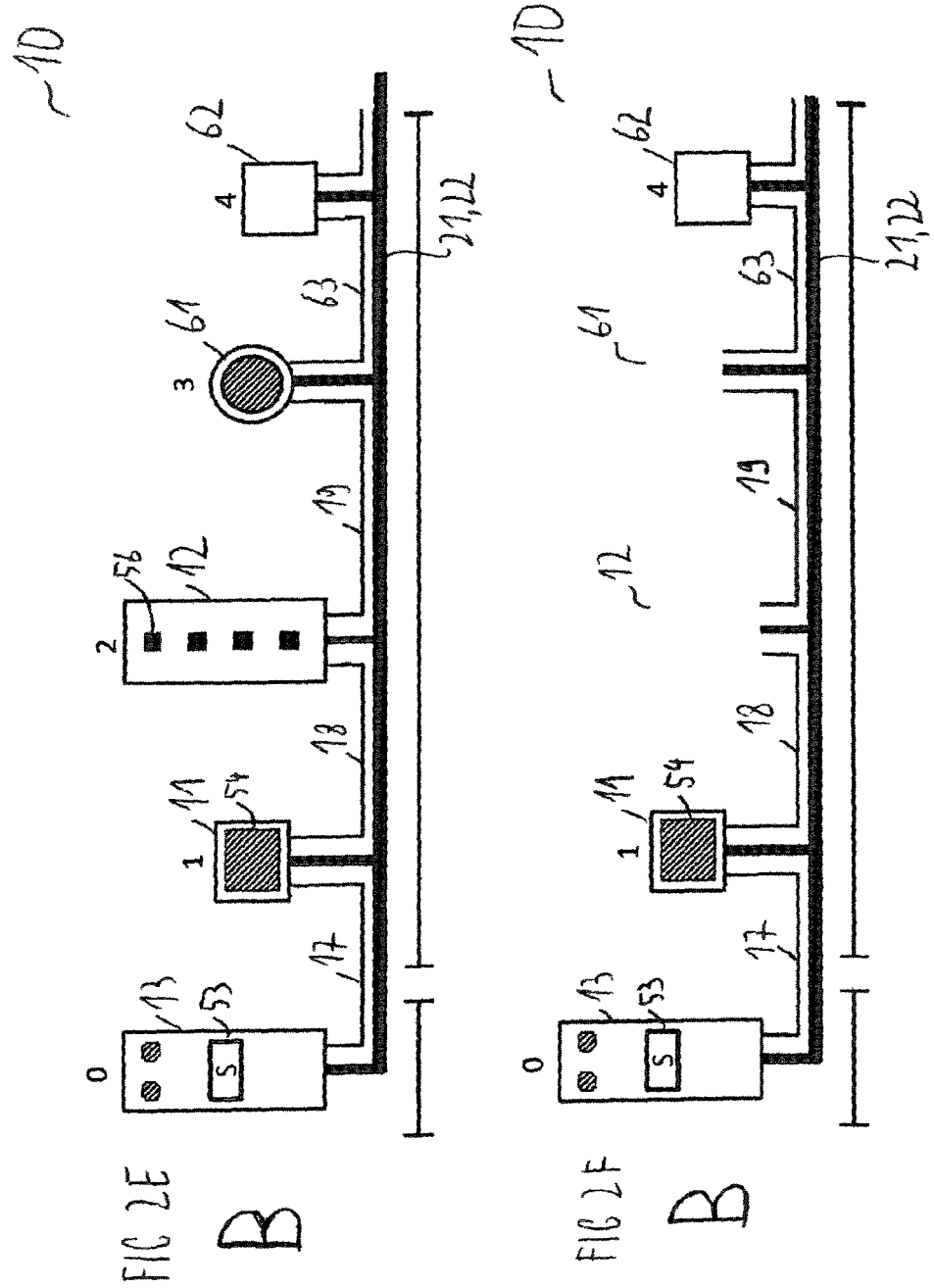

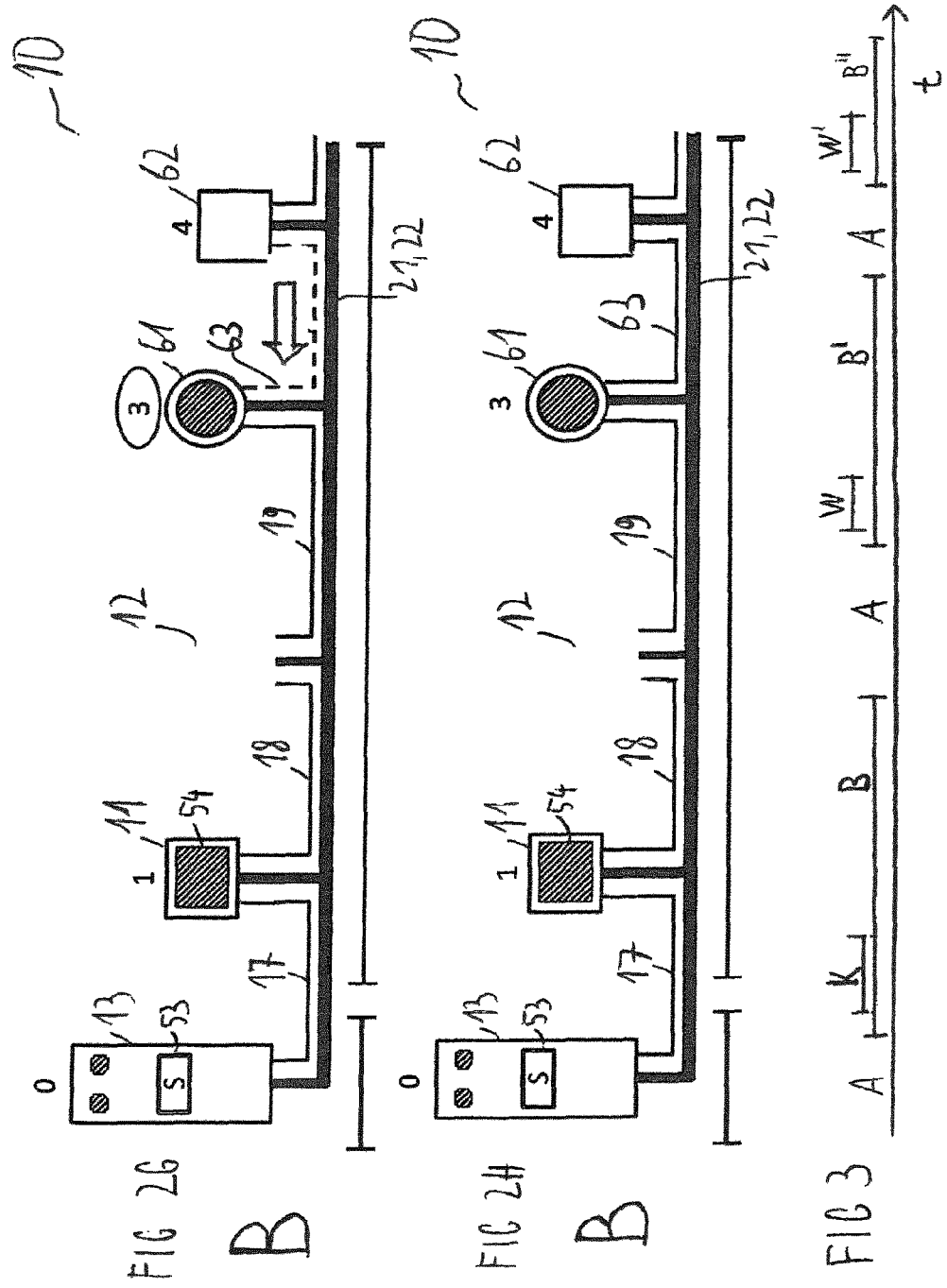

SYSTEM AND METHOD FOR OPERATING A BUS CONFIGURATION WITH A SWITCHABLE CURRENT SOURCE

CROSS-REFERENCE TO PRIOR APPLICATIONS

This application is a U.S. National Stage Application under 35 U.S.C. § 371 of International Application No. PCT/EP2017/052249 filed on Feb. 2, 2017, and claims benefit to German Patent Application No. DE 10 2016 103 928.4 filed on Mar. 4, 2016. The International Application was published in German on Sep. 8, 2017 as WO 2017/148645 A1 under PCT Article 21(2).

FILED

The present invention relates a bus configuration and a method for operating a bus configuration.

BACKGROUND

A bus configuration can be used in automation technology, for example. A bus configuration typically has a coordinator and a plurality of stations. The stations may be implemented as actuators or sensors. The actuators may be switching devices, such as contactors, motor starters and power switches, command devices and frequency converters.

SUMMARY

An embodiment of the present invention provides a bus arrangement that includes: a coordinator; a first subscriber; a second subscriber; and a bus. The bus includes: a first signal line coupling the first subscriber and the coordinator; a second signal line connecting the second subscriber to the first subscriber; and at least one bus line connecting the coordinator to the first subscriber and the second subscriber. The coordinator is configured to send a message via the at least one bus line to the second subscriber with a command to activate the first subscriber via the second signal line. The first subscriber includes a first current sensor and the second subscriber includes a switchable current source. The second signal line couples the first current sensor with the switchable current source.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 2A to 2H show an example of an embodiment of a bus configuration in various phases;

FIG. 3 shows an example of a chronological sequence of phases in a bus configuration.

DETAILED DESCRIPTION

Figure 1:
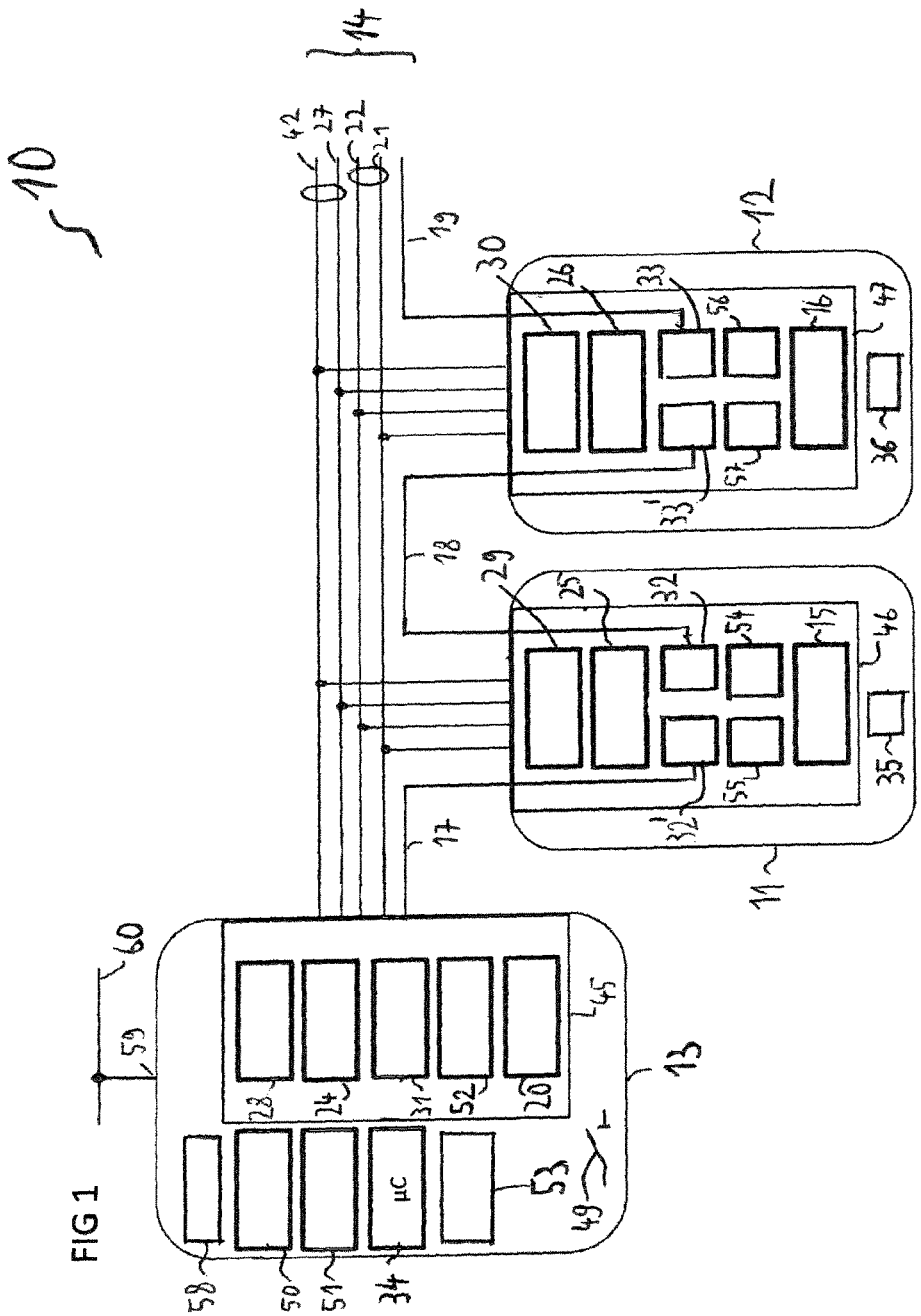
FIG. 1 shows an example of an embodiment of a bus configuration.

Embodiments of the present invention provide a bus configuration and a method for operating a bus configuration in which a station can be activated in reverse.

In one embodiment, the bus configuration includes a coordinator, a first station, a second station and a bus. The bus includes a first signal line, which couples the first station and the coordinator, a second signal line, which connects the second station to the first station, and at least one bus line, which connects the coordinator to the first and second stations. The coordinator is designed to send a telegram with a command over the at least one bus line to the second station to activate the first station over the second signal line.

The first station is thus advantageously activated by the second station, even if the first station is coupled to the bus between the coordinator and the second station and is therefore closer to the coordinator than the second station. The first station is thus activated in the reverse direction. In one embodiment, the coordinator sends a telegram only to the second station via the at least one bus line with the command to activate the first station via the second signal line. This telegram is not directed at the first station or at additional stations but instead is directed only to the second station. This telegram thus includes a serial number or a station address of the second station. Exactly one station, namely here the second station, is advantageously addressed, so that it activates its predecessor on the bus, which is the first station here.

In one embodiment, the coordinator sends a telegram containing a first station address to all stations over the at least one bus line. The first station saves the first station address in a first volatile memory of the first station in the activated state.

In one embodiment, the coordinator in a configuration phase activates the first station over the first signal line and sends the telegram containing the first station address to all the stations over the at least one bus line and thus also to the first and second stations. The first station saves the first station address in the first volatile memory. Due to the fact that exactly one station is activated, namely in this case the first station, only this station saves the station address provided over at least one bus line. Such a telegram sent over the bus line to all stations can also be referred to as a broadcast message. Since the first station then continues to save the first station address in the first volatile memory in the operating phase initiated by the configuration phase, it can be addressed by using the first station address. The first station can be activated directly by the coordinator, or if additional stations are arranged between the coordinator and the first station, the latter can be activated via the station preceding the first station. The first station is thus activated in the forward direction.

In one embodiment, the first station activates the second station over the second signal line in the configuration phase. The coordinator sends a telegram to all stations containing a second station address over the at least one bus line and therefore to the first and second stations. The second station saves the second station address in a second volatile memory. Since only the second station is activated in the period of time in which the telegram with the second station address is sent, only the second station receives the second station address in its volatile memory. The second station is thus activated in the forward direction. The first and second volatile memories lose their memory contents in a deactivation phase.

In one embodiment, the bus configuration includes an additional station, which is connected to the bus between the coordinator and the first station in the configuration phase and is removed after the configuration phase. In a restart phase after the configuration phase, the coordinator sends the telegram over the at least one bus line with the command to activate the first station via the second signal line. The first station can therefore also be activated advantageously, even when there is no station between the coordinator and the first station, namely in the reverse direction.

In one embodiment, the first station is replaced with another first station in a deactivation phase, which is between the configuration phase and another configuration phase. The coordinator activates the additional first station in the additional configuration phase via the first signal line and/or by means of the second station via the second signal line.

In one embodiment, the coordinator includes a switch and carries out the additional configuration phase after actuation of the switch.

In one embodiment, the first station includes a first current sensor. The second station includes a switchable current source. The second signal line couples the first current sensor to the switchable current source.

In one embodiment, the second station activates the first station by the fact that the second station switches the switchable current source between a conducting state and a nonconducting state, and the first station detects the change in a current flowing through the second signal line by means of the first current sensor.

In one embodiment, the first station includes a first switch, which is arranged in series with the first current sensor. The second station includes a second current sensor, which is coupled to the switchable current source. The second current sensor detects the current flow through the second signal line.

In one embodiment, the first station activates the second station by the fact that the first station switches the first switch between a conducting state and a nonconducting state. The second station detects the change in current flow through the second signal line with the second current sensor.

In one embodiment, the first signal line connects the first station to the coordinator. The first station and the coordinator are thus connected directly and permanently to one another via the first signal line.

In one embodiment, the second station is connected directly and permanently to the first station via the second signal line. The second station is not connected directly to the first signal line. The second station is coupled to the first signal line only via the first station. Accordingly, the coordinator is not connected directly to the second signal line. The coordinator is coupled to the second signal line via the first station.

Both the coordinator and the first station as well as the second station are connected directly to the at least one bus line.

In one embodiment, the bus has the at least one bus line as well as an additional bus line. The bus thus has exactly two bus lines, namely a first bus line and a second bus line. The first and second bus lines can be operated according to the interface standard TIA/EIA-485 A, also referred to as EIA-485 or RS-485.

In one embodiment, the bus configuration includes one or more additional stations, which are connected to at least one bus line. An additional station can be connected to the second station via a third signal line. However, the additional stations can also be situated between the coordinator and the first station, for example.

In one embodiment, at least one of the stations is implemented as an actuator, a measurement device or a sensor. The actuator may be a switching device—such as a contactor, a motor starter or a power switch—a control device, a command device, a reporting device, an operating device or a frequency converter.

In one embodiment, the configuration phase is part of an operating phase. The operating phase is followed by a deactivation phase and then an additional operating phase beginning with a restart phase. In the remaining course, additional operating phases, each having a restart phase at the beginning and deactivation phases, may alternate. Thus, the restart phase follows the configuration phase. In one embodiment, the coordinator in the operating phase detects the outage of a station, such as the first and/or second station, and saves the information about an outage of the station in a nonvolatile memory, such as an outage of the first and/or second station. The coordinator registers the outage of the station as an outage. Outage of a station can be triggered by a defect in the station, for example, or by removal of the station and therefore absence of the station.

In one embodiment, the coordinator can reactivate a station that has failed. This activation may take place in the forward direction or in the reverse direction.

In one embodiment, only one single station has failed. Therefore, there are not two or more stations in a row on the bus that have failed. A single station can be activated in the forward direction. To do so, the coordinator sends a telegram to the station situated between the coordinator and the failed station, namely directly upstream from the failed station. The telegram contains a command for output of a signal to the signal line for activation of the failed station. The failed station confirms its activation over the at least one bus line and receives its station address. Then the coordinator stores the information about the usability of the station, which is now no longer in outage, in the nonvolatile memory.

In one embodiment, for example, the second station has failed and the first station is functional. The coordinator therefore sends a telegram to the first station over the at least one bus line. The first station activates the second station over the second signal line, and the second station confirms the activation with respect to the coordinator. Next, the coordinator saves the information about the usability of the second station in the nonvolatile memory.

In one embodiment, two or more stations connected in series have failed. The failed station, which is next to the coordinator, can be activated by means of the preceding station, as described above. However, if activation in the forward direction is impossible, e.g., because a station is missing or cannot be activated, then activation may also take place in the reverse direction.

In one embodiment, only a single station has failed. Therefore, there are not two or more stations one after the other on the bus that have failed. A single station can be activated in the forward direction. To do so, the coordinator sends a telegram to the station between the coordinator and the failed station, namely directly upstream from the failed station. The telegram contains a command for output of a signal to the signal line for activation of the failed station. The failed station confirms its activation via the at least one bus line and receives its station address. Then the coordinator saves the information about the usability of the station, which is now no longer in outage, in the nonvolatile memory.

In one embodiment, the second station has failed, for example, and the first station is functional. The coordinator therefore sends a telegram to the first station via the at least one bus line. The first station activates the second station over the second signal line, and the second station confirms the activation with respect to the coordinator. Then the coordinator saves the information about the usability of the second station in the nonvolatile memory.

In one embodiment, two or more stations in succession have failed. The failed station, which is next to the coordinator, can be activated by means of the temporary station, as described above. However, if activation in the forward direction is impossible, e.g., because a station is missing or cannot be activated, then activation may also take place in the reverse direction.

In one embodiment, for example, the first station and an additional station between the coordinator and the first station have failed. The coordinator can send a telegram to the second station via the at least one bus line in the operating phase at a later point in time. The second station activates the first station via the second signal line, so that the first station confirms the activation to the coordinator via at least one bus line. Then the coordinator saves the information about the usability of the first station in a nonvolatile memory. The coordinator sends the first station address to all the stations. Since only the first station is activated, only the first station receives the first station address in its nonvolatile memory. Therefore, despite the gap between the first station and the coordinator, the first station can be activated in the reverse direction with the help of the second station.

In one embodiment, a method for operating a bus configuration includes sending a telegram from a coordinator to a second station via at least one bus line with the command that the second station should activate a first station via a second signal line. The bus includes a first signal line, which couples the first station and the coordinator, connecting the second signal line, which connects the second station to the first station, and the at least one bus line, which connects the coordinator to the first and second stations.

The first station can advantageously be activated in reverse.

In one embodiment, the first station includes a first current sensor. The second station includes a switchable current source. The second signal line couples the first current sensor to the switchable current source.

The bus configuration is designed to address stations in two directions. The bus configuration is designed to assign its station address to a station from two directions. The bus configuration is designed to carry out a geographic station detection when there are segment gaps with upstream addresses and downstream addresses. It is possible to replace bus stations during operation, which is referred to in English as a "hot swap." The bus configuration may also be referred to as bus system.

The bus configuration implements directional addressing of stations. The bidirectional method implements geographic determination and addressing of stations in the bus configuration. Addressing is often understood to below to refer to an address allocation. The bus configuration implements a bidirectional allocation of station addresses to the stations. The bidirectional method implements a geographic determination and address allocation of stations in the bus configuration.

The signal line connecting two stations physically to one another may be used bidirectionally. The signal line is a connection line between a signal output circuit of one station and a signal input circuit of the next station. Thus there is the possibility that after initial addressing, bus segments can be newly inserted by the fact that addressing is possible not only from left to right but also from right to left and thus geographically in descending order of addresses. Therefore, after an initial address allocation, a bus segment can also be inserted as a new bus segment by the fact that the address allocation takes place geographically, not only from left to right but also from right to left and therefore in descending order of addresses.

In initial operation of the bus configuration, the method via the signal lines is used. All the stations on the bus are addressed by the coordinator successively in ascending order of addresses. This method ends before the first missing station and/or at the last possible station to be addressed. In other words, station addresses are allocated by the coordinator to all stations on the bus successively in ascending order of addresses. This method ends before the first missing station and/or at the last possible station to which a station address is allocated. The signal lines here each ensure the geographic position of the bus stations. Each station has a device identity (manufacturer, device, version), (typically known in English as vendor, device, version), indicating the type of device. The device identity can also be referred to as the device ID. The device ID is read out by each station and saved in a nonvolatile memory in the coordinator. Stations can be activated and deactivated individually, but also in segments, by this method and can also be replaced in an operating mode provided for this purpose.

Restart of a station and/or a station segment can be carried out. The coordinator typically addresses the bus stations via the signal lines from left to right and then in ascending address sequence. Consequently, the coordinator can allocate station addresses to the bus stations via the signal lines from left to right in ascending order of addresses.

If station gaps now occur in the operating phase, in bidirectional addressing there is the additional option of utilizing the signal line of the next station, which is still present. This means that any stations can be detected geographically, even in descending direction of addressing. In an addressing procedure in the opposite direction, the station to be addressed will then be able to measure a current at its output, which is connected by the signal line to a station with a higher address. However, to be able to use this inverted direction of addressing at all, the station with the higher address has a switchable current source.

In other words, if station gaps now develop in the operating phase, there is the additional possibility with a bidirectional address allocation to utilize the additional possibility of the signal line being utilized by the next station that is still in existence. This means that any number of stations can also be detected geographically in descending order of station addresses. In a procedure of address allocation in the opposite direction, the station to which a station address is to be allocated will then be able to measure a current at its output, which is connected by the signal line to a station of a higher address. However, in order to be able to utilize this reverse direction of address allocation at all, the station with the higher address will have a switchable current source.

Addressing in the reverse direction, i.e., allocation of station addresses in the reverse direction, is used as an additional option during operation in the event of failure of segments and reconnection. By checking the device ID (vendor, device, version, . . . ), it is then also possible to replace stations when a special (optional) operating mode has been selected. Because of the saved device ID and the geographically detectable position, the coordinator is now also capable of addressing and accepting other new devices. The coordinator is then capable of also allocating and accepting a station address based on the saved device ID and the geographically detectable position of now other devices.

Use of optional stations in a bus system advantageously permits flexible handling for the user because of the additional address allocation variant.

The invention will now be explained in greater detail below on the basis of several exemplary embodiments with reference to the figures. Function components and/or components having the same effect or function units have the same reference numerals. Inasmuch components or function units correspond in their function, their description is not repeated in each of the figures.

FIG. 1 shows an example of one embodiment of a bus configuration 10 having a first station 11 and a second station 12, a coordinator 13 and a bus 14. The coordinator 13 is connected to the first and second stations 11, 12 via the bus 14. The first and second stations 11, 12 each have a processor core 15, 16. The bus 14 includes a first signal line 17, which connects a terminal of the coordinator 13 to a terminal of the station 11 and thus, for example, to a terminal of the processor core 15 of the first station 11. The first signal line 17 is not connected directly to the second station 12 or any other station. For reasons of simplicity, most lines in the coordinator 13 and in the first and second stations 11, 12 are not shown.

In addition, the bus 14 includes a second signal line 18, which connects a terminal of the first station 11 to a terminal of the second station 12. For example, the second signal line 18 connects the processor core 15 of the first station 11 to the processor core 16 of the second station 12. In addition, the bus 14 may include a third signal line 19, which connects a terminal of the second station 12 to a third station (not shown). The coordinator 13 includes a processor core 20, which is connected to the first signal line 17. The bus 14 is implemented as a linear bus. The bus 14 may be designed as a serial bus. The coordinator 13 may be implemented as a master. The stations 11, 12 may be implemented as slaves. The processor core 15, 16, 20 may be implemented as a microprocessor. The bus 14 is not implemented as a ring bus.

The processor core 20 of the coordinator 13 is connected to the first signal line 17 via a first signal output circuit 31, also known as a "Sel Out" circuit, of the coordinator 13. In addition, the processor core 15 of the first station 11 is also connected as a "Sel In" circuit to the second signal line 18 via a signal input circuit 32' of the first station 11. The processor core 16 of the second station 12 is connected to the second signal line 18 via a signal input circuit 33' of the second station 12 and, if a third station is present, connected to the third signal line 19 via signal output circuit 33 of the second station 12.

In addition, the bus 14 includes at least one bus line 21, which connects the coordinator 13 to all the stations and thus to the first and second stations 11, 12. A signal on the at least one bus line 21 reaches all stations 11, 12. The bus 14 may include an additional bus line 22 which connects the coordinator 13 to all stations 11, 12. The at least one bus line 21 and the additional bus line 22 may also be referred to as the first and second bus lines. The coordinator 13 includes a transceiver 24, which couples the processor core 20 to the first and second bus lines 21, 22. The first and second stations 11, 12 also each include a transceiver 25, 26 having two terminals connected to the first and second bus lines 21, 22. In the first and second stations 11, 12, the transceiver 25, 26 is coupled to the processor core 15, 16. The first and second bus lines 21, 22 and transceivers 24-26 of the coordinator 13 and the stations 11, 12 can be implemented according to TIA/EIA-485 A standard. Transceivers 24-26 of the coordinator 13 and stations 11, 12 may be designed as sending and receiving transceivers and implemented for half-duplex operation.

In addition, the bus 14 includes a supply line 27 connecting a voltage supply 28 of the coordinator 13 to a voltage supply 29 of the first station 11 and a voltage supply 30 of the second station 12. The voltage supply 28, 29, 30 may be implemented as a voltage regulator in each case.

In addition, the first and second stations 11, 12 may each have an application device 35, 36. The application device 35, 36 may be implemented as an actuator device, a measurement device or a sensor device. The first and second stations 11, 12 may thus be implemented as actuators, measurement devices and/or sensors. The application device 35 of the first station 11 is coupled to the processor core 15 of the first station 11. The situation is similar for the second station 12. Furthermore, the bus 14 includes a reference potential line 42 connecting a reference potential terminal of the coordinator 13 to reference potential terminals of the first and second stations 11, 12. Coordinator 13 supplies the stations 11, 12 with electrical power via the supply line 27 and the reference potential line 42.

In addition, coordinator 13 includes a memory 53, which is connected to the processor core 20 or to a microcontroller 34 of the coordinator 13. The memory 53 of the coordinator 13 may be implemented as a nonvolatile memory, for example, as a semi-permanent memory such as an electrically erasable programmable read-only memory, abbreviated EEPROM, or a flash EEPROM. In addition, the coordinator 13 includes a volatile memory 52.

The first station 11 includes a first volatile memory 54 and a first nonvolatile memory 55, which may be connected to the transceiver 25. The second station 12 includes a second volatile memory 56 and a second nonvolatile memory 57, which may be connected to the transceiver 26. The first and second nonvolatile memories 55, 57 may be, for example, permanent memories, such as a read-only memory, abbreviated ROM, a programmable read-only memory, abbreviated PROM or a one-time programmable module abbreviated OTP module. The volatile memories 52, 54, 56 may each be implemented as random access memories, abbreviated RAM, or flash memories.

The coordinator 13 includes an integrated circuit 45 which may be implemented as an ASIC. The integrated circuit 45 may include the voltage supply 28, the transceiver 24, the signal output circuit 31, the volatile memory 52 and the processor core 20. In addition, the first and second stations 11, 12 each include an integrated circuit 46, 47, which may be implemented as an ASIC. The integrated circuit 46 of the first station 11 may include the voltage supply 29, the transceiver 25, the signal input circuit 32', the signal output circuit 32, the first volatile memory 54, the first nonvolatile memory 55 and the processor core 15. The integrated circuit 47 of the second station 12 may also be implemented accordingly.

The coordinator 13 includes an additional transceiver 58 which couples an additional bus terminal 59 to the microcontroller 34. In addition, the bus configuration 10 includes a field bus 60 which is connected to the additional bus terminal 59. The coordinator 13 may be a gateway, router or switch. The coordinator 13 has an oscillator 50. The oscillator 50 may be embodied as an RC oscillator. The oscillator 50 may be used for time control. The coordinator 13 may have an additional memory 51, implemented as a RAM or flash memory.

The bus 14 is implemented as a flat strip cable or round cable. According to FIG. 1 the bus 14 may consist of five strands, for example. Alternatively, the bus 14 may have a different number of strands, for example, eight strands.

The functioning of the bus configuration 10 according to FIG. 1 will now be explained in greater detail with reference to FIGS. 2A through 2H.

FIGS. 2A through 2H show an example of an embodiment a bus configuration 10, which is a refinement of the embodiment illustrated in FIG. 1. Bus configuration 10 includes coordinator 13, first and second stations 11, 12 and third and fourth stations 61, 62. Coordinator 13 is connected directly to the first station 11 via the first signal line 17. The first station 11 is connected directly to the second station 12 via the second signal line 18. The second station 12 is connected directly to the third station 61 via the third signal line 19 accordingly. In addition, the third station 61 is connected to the fourth station 62 via a fourth signal line 63. The first through fourth signal lines 17, 18, 19, 63 form a daisy chain. In addition, coordinator 13 is connected directly to all stations 11, 12, 61, 62 via at least one bus line 21 and the additional bus line 22, which are also referred to as the first and second bus lines.

FIG. 2A shows the bus configuration 10 in a deactivation phase A. The deactivation phase A may occur before an operating phase B, for example, which begins with a configuration phase K. Alternatively, the deactivation phase A may occur before an additional operating phase B', which begins with a restart phase W. Coordinator 13 has an address, for example, 0. In the first through fourth stations 11, 12, 61, 62, no station addresses are saved. In FIGS. 2B through 2E, the stations 11, 12, 61, 62 are addressed successively from left to right via the coordinator 13 and with the help of the signal lines 17, 18, 19, 63 (i.e., successive station addresses are allocated to stations 11, 12, 61, 62) and the geographic positions and thus the order of stations 11, 12, 61, 62 are defined.

In an alternative embodiment (not shown), the coordinator 13 is coupled to the first station 11 via the first signal line 17 and one or more additional stations as well as one or more additional signal lines.

FIG. 2B shows the bus configuration 10 according to FIG. 2A in the configuration phase K. The coordinator 13 activates the first station 11 via the first signal line 17. To indicate the activation, the first signal line 17 is shown with broken lines. An arrow indicates the direction of activation. After activation, coordinator 13 sends a telegram containing a first station address via the first and second bus lines 21, 22 to all stations 11, 12, 61, 62. Only the activated station, namely the first station 11, receives the first station address contained in the telegram in its first volatile memory 54. The first station address may be 1.

As explained, the coordinator 13 activates its signal output circuit 31 and sends the station address 1 to be issued as a broadcast over the RS 485 bus line/data line to all stations 11, 12, 61, 62. After reception, all the stations 11, 12, 61, 62 then check their signal input circuit 32', 33' but only the segment between the coordinator 13 and the first station 11 is activated. Thus, the first geographic station 11, in addition to coordinator 13, also receives station address number 1. After this point in time, this station 11 then receives all messages directed to station address 1.

FIG. 2C shows the bus configuration 10 already shown in FIGS. 2A and 2B in another step of the configuration phase K. The coordinator 13 receives a connection to the first station 1 via the first and second bus lines 21, 22 in order to read out a first serial number of the first station 11. Therefore, coordinator 13 sends a telegram to all stations 11, 12, 61, 62, including the first station address as well as the command to supply serial numbers. The transceiver 25 of the first station 11 recognizes that the first station 11 has been addressed and causes the processor core 15 of the first station 11 to send the first serial number over the first and second bus lines 21, 22 to the coordinator 13, which saves it in the nonvolatile memory 53. Therefore, the first station 11 is registered in the coordinator 13.

In FIG. 2C, the coordinator 13 is capable of connection to the first station 11 and querying its data. Among other things, the first serial number, including the vendor ID, version, etc., for example, is read out and linked in the coordinator 13 with the respective first station address and saved in a remanent form. Coordinator 13 then resets its signal output circuit 31.

FIG. 2D shows the bus configuration 10, already shown in FIGS. 2A through 2C, in another step of the configuration phase K. The coordinator 13 sends a telegram to the first station 11 with the command to activate the signal line at the output end, i.e., the second signal line 18. The first station 11 recognizes by means of its transceiver 25 that it has been addressed and it activates via a signal on the second signal line 18 the second station 12. Then the coordinator 13 sends a telegram to all stations 11, 12, 61, 62 containing the second station address, e.g., 2. However, since only the second station 12 has been activated, only the second station 12 receives the second station address into its second volatile memory 56. As an additional step in configuration phase K, the coordinator 13 prompts the second station 12 to supply the second serial number. The second station 12 is registered by saving the second serial number in the nonvolatile memory 53 of the coordinator 13.

According to FIG. 2D, the first station 11 receives the order to activate its signal output circuit 32 so that the addressing can be continued. The coordinator 13 sends a broadcast message for addressing with the station address 2.

The first station 11 receives the order to activate its signal output circuit 32 so that the allocation of station addresses can be continued. The coordinator 13 sends a broadcast message with the station address 2 for allocation of the station address. Coordinator 13 continues this procedure until all detectable stations have been allocated a station address. Consequently, the third station 61 is activated, and a third station address, for example, 3 is allocated to it, and a third serial number of the third station 61 is queried. The fourth station 62 performs corresponding steps.

FIG. 2E shows the bus configuration 10 which was already shown in FIGS. 2A through 2D, in the operating phase after conclusion of the coordination phase K. The coordinator 13 is now capable of addressing all stations 11, 12, 61, 62 via the station addresses. The addressed stations 11, 12, 61, 62 are saved including parameter data and configuration data (serial numbers, manufacturer identity) in remanent form in the coordinator 13. Previously detected stations 11, 12, 61, 62, including after outages, can be addressed again by the coordinator 13 based on the unique serial number. The addressed stations 11, 12, 61, 62 do not save their station addresses in remanent form so that they can behave again as they did at the beginning, for example, as shown in FIG. 2A, after renewed power-up. The addressed stations 11, 12, 61, 62 are stations to which station addresses have been allocated.

FIG. 2F shows the bus configuration 10 as already explained in FIGS. 2A to 2E, in the operating phase B. Stations may fail in operating phase B. In the example shown in FIG. 2F, the second and third stations 12, 61 have failed. The coordinator 13 is additionally capable of sending telegrams to the stations 11, 62 that have not failed via the first and second bus lines 21, 22 and controlling the stations 11, 62 that have not failed or querying their data. The coordinator 13 recognizes the failure of the stations namely in this case the second and third stations 12, 61, and saves information about the failure of the failed stations 12, 61 in the nonvolatile memory 53, i.e., it registers them as failed.

Even after failure of stations 12, 61, the bus configuration 10 continues to operate. In the sample shown in FIG. 2F, the second and third stations 12, 61 are now reported as missing. The coordinator 13 takes over the role of the failed stations 12, 61. The volatile memory 54, 56 of the failed station(s) 12, 61 usually loses the station address during the outage.

The coordinator 13 is configured so that it reactivates one or more failed stations, for example, at predetermined points in time or acyclically. A failed station can be repaired in a deactivation phase A, for example. In embodiment the failed station can also be removed in an operating phase B and reinserted after being repaired. This method is known as "hot plug."

FIG. 2G shows the exemplary bus configuration 10, as already shown in FIGS. 2A to 2F, in a part of the operating phase B. As shown in FIG. 2F, two stations, namely the second and third stations 12, 61 have failed. Only the third station 61 is present again and is to be coupled again. According to FIG. 2G, coordinator 13 sends a telegram to the fourth station 62 that has not failed for activation via the first and second bus lines 21, 22. According to a command contained in this telegram, the fourth station 62 delivers a signal to the third station 61 via its signal line 63 on the input end. Therefore, the third station 61 is activated. Coordinator 13 sends a telegram, which can be referred to as a broadcast message, to all stations 11, 12, 61, 62, which contains the third station address. Since only the third station 61 is activated, only the third station 61 receives and saves the third station number, for example, in its volatile memory. Thus, due to the response of the third station 61, the geographic position of the third station 61 can be confirmed by the fourth station 62, i.e., by activation of the third station 61 by the fourth station 62. This third station 61 can again be registered as active in the coordinator 10. Thus a reverse addressing, more specifically a reverse address allocation is made possible.

The coordinator 13 sends the telegram over the at least one bus line 21 only to the fourth station 62, with the command to activate the third station 61 via the fourth signal line 63. This telegram is not directed at the first through third stations 11, 12, 61 or to any other stations. Therefore, this telegram is not a broadcast message or a radio message. This telegram may thus include, for example, a fourth serial number or a fourth station address of the fourth station 62 for unique identification of the addressee, namely the fourth station 62.

Because of the bidirectional signal line function, any stations can be placed in the position of the third station 61. The sequence of the address allocation described above can thus take place in the opposite order from the order in the configuration phase K, i.e., from right to left. To find the geographic location of the third station 61, a station (e.g., the fourth station 62) can be prompted in a targeted manner to activate its signal input circuit to thereby enable a current flow at all. Newly added stations 61 are not prompted to activate their signal output circuit and check it for current flow. The third station 61 can thus be detected geographically and checked online for use in this position.

FIG. 2H shows the bus configuration 10 which is already shown in FIGS. 2A to 2G after carrying out the steps explained with reference to FIG. 2G. The third station 61 has retained its station address 3 and, after a positive check by the coordinator 13, can be included again in the bus configuration 10. The coordinator 13 saves in its nonvolatile memory 53 the fact that the third station 61 is active.

FIG. 3 shows an example of an embodiment of the time curve of the phases. The various phases are plotted over time t. The configuration phase K is carried out at the start of the operating phase B. After carrying out the coordination phase, for example, a regular operation of the bus configuration 10 is carried out in the operating phase B. After the operating phase B there is a deactivation phase A. In the deactivation phase A the coordinator 13 and the stations 11, 12, 61, 62 are not supplied with electric power. Deactivation phase A is followed by another operating phase B'. At the start of the additional operating phase B' a restart phase W is carried out. After the restart phase W, regular operation of the bus configuration 10 is implemented in the further operating phase B'. Additional deactivation phases A and additional operating phases B" can follow the additional operating phase B'. The failure of stations, as illustrated in FIGS. 2F through 2G, and the activation of stations may take place in each one of the operating phases B, B', B".

In the restart phase W, the coordinator 13 carries out the same steps to assign the station addresses to the stations as in the configuration phase K. In addition, the coordinator 13 makes a comparison of the serial numbers queried in the restart phase W with the serial numbers saved in its nonvolatile memory 53.

An operator can also reset the bus configuration 10 by means of a switch 49 of the coordinator 13, for example, so that the bus configuration 10 starts again with an operating phase B having a configuration phase K.

Figure 4:
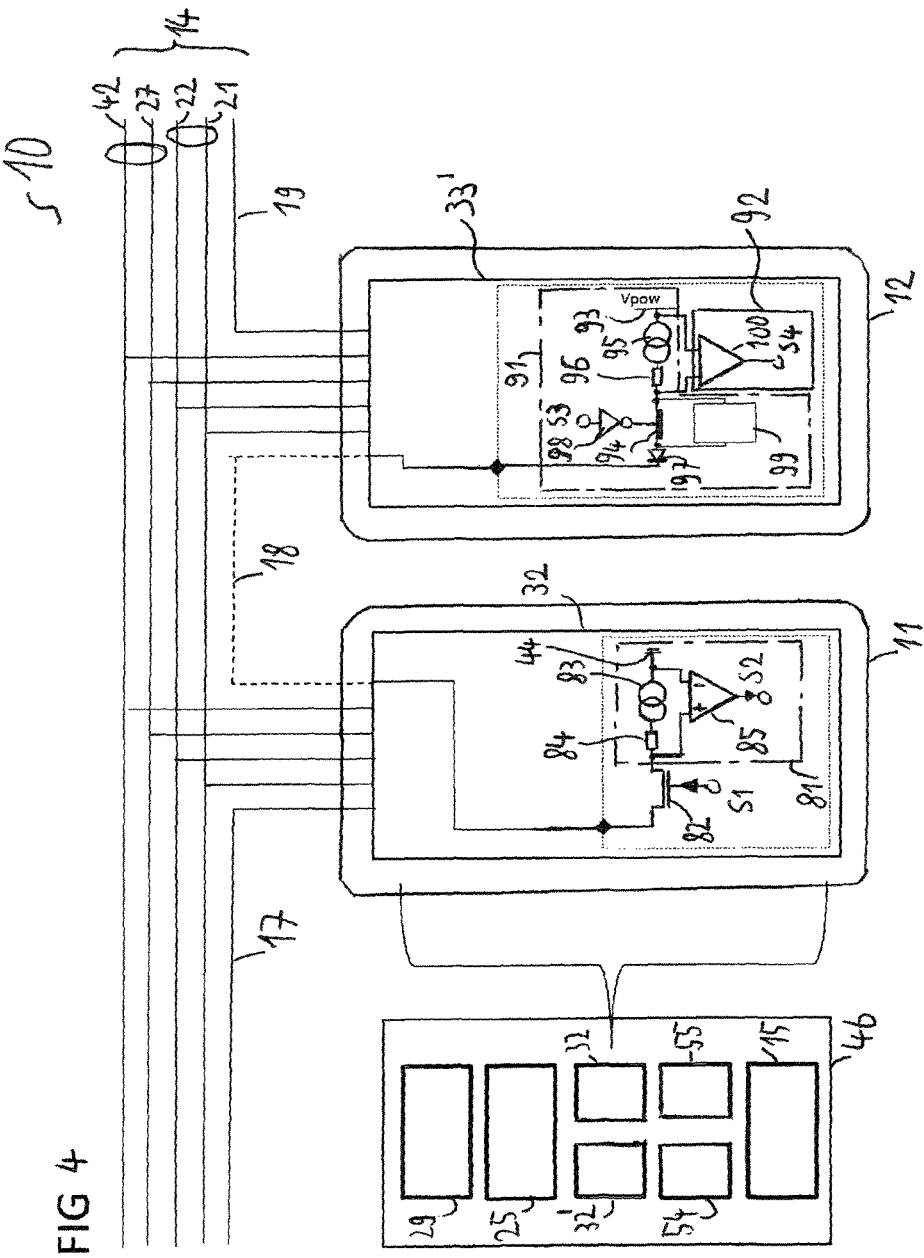
FIG. 4 shows an example of an embodiment of two stations of a bus configuration.

FIG. 4 shows an example of an embodiment of the first and second stations 11, 12, such as those which can be achieved in bus configuration 10 according to FIGS. 1 and 2A through 2H. The embodiment shown in FIG. 4 can also be implemented independently of the methods and circuit details described above. The signal output circuit 32 of the first station 11 includes a first current sensor 81 at the output end. The first current sensor 81 is situated between the second signal line 18 and the reference potential terminal 44. In addition, the signal output circuit 32 of the first station 11 includes a first switch 82 which is arranged in series with the first current sensor 81. The series circuit including the first switch 82 and the first current sensor 81 couples the second signal line 18 to the reference potential terminal 44. In doing so the first switch 82 is connected to the second signal line 18, and the first current sensor 81 is connected to the reference potential terminal 44.

The first switch 82 is implemented as a transistor. The first switch 82 can be manufactured as a field effect transistor, in particular as a metal oxide semiconductor field effect transistor. The first current sensor 81 includes a current sink 83 and a current sink resistor 84 arranged in series with one another. In addition, the current sensor 81 includes a first comparator 85. The inputs of the first comparator 85 are connected to the terminals of the series circuit including the current sink 83 and the current sink resistor 84. A first input of the first comparator 85 is thus connected at a node between the first switch 82 and the first current sensor 81. A second input of the first comparator 85 is connected to the reference potential terminal 44. The processor core 15 of the first station 11 delivers a signal S1 to a control terminal of the first switch 82. The signal S1 is a signal to be transmitted by the signal output circuit 32. One output of the first current sensor 81 is coupled to an input of the processor core 15 of the first station 11. The first current sensor 81 delivers a current detection signal S2. One output of the first comparator 85 is connected to the output of the first current sensor 81.

The signal input circuit 33' of the second station 12 includes a switchable current source 91. The switchable current source 91 is arranged between a supply voltage terminal 93 and the second signal line 18. The switchable current source 91 includes a second switch 94 arranged between the second signal line 18 and the supply voltage source 93. In addition, the switchable current source 91 includes a current source circuit 95 and a current source resistor 96 arranged in series with one another. In addition, the switchable current source 91 includes a diode 97 in series with the second switch 94. Thus, a series circuit including diode 97, second switch 94, current source circuit 95 and current source resistor 96 connects the supply voltage terminal 93 to the second signal line 18.

The second switch 94 is connected at a control input to the processor core 16 of the second station 12. An inverter 98 may be arranged between the processor core 16 and the control terminal of the second switch 94. The second switch 94 may be implemented as a transistor, for example, as a field effect transistor, in particular as a metal oxide semiconductor field effect transistor. The two terminals of the second switch 94 are connected to a voltage limiting circuit 99, known in English as a voltage limiter. A signal S3 is sent to the second switch 94 via the inverter 98. The signal S3 is a signal to be transmitted by the signal input circuit 33'.

In addition, the signal input circuit 33' of the second station 12 includes a second current sensor 92, which is coupled to the switchable current source 91. One output of the second current sensor 92 is connected to an input of the processor core 16 of the second station 12. The second current sensor 92 includes a second comparator 100. The two inputs of the second comparator 100 are connected to the terminals of the series circuit including the current source circuit 95 and the current source resistor 96. A first terminal of the second comparator 100 is therefore connected to the voltage supply terminal 93. A second input of the second comparator 100 may be connected to a terminal of the second switch 94. One output of the second comparator 100 is connected to the output of the second current sensor 92. The second current sensor 92 delivers a current detection signal S4.

The first and second comparators 85, 100 may have a built-in threshold value. The current detection signal S2 at the output of the first comparator 85 changes only when the difference in voltages on the two inputs of the first comparator 85 is greater than the threshold value. The situation is similar for the second comparator 100 and the current detection signal S4.

The signal output circuit 33 (not shown) of the second station 12 also includes a first switch and a first current sensor arranged between the third signal line 19 and the reference potential terminal 44 and implemented like the first switch 82 and the first current sensor 81 of the first station 11. The coordinator 13 (not shown in FIG. 4) also has the signal output circuit 31 with a first switch and a first current sensor between the processor core 20 and the first signal line 17, implemented like the first switch 82 and the first current sensor 81. Accordingly the signal input circuit 32' (not shown) of the first station 11 also has a switchable current source which couples the first signal line 17 to a supply voltage terminal, and a second current sensor which are implemented like the switchable current source 91 and the second current sensor 92 of the second station 12.

In configuration phase K, the switchable current sources 91 of all stations 11, 12 are switched to conducting. The first switches 82 of all stations 11, 12 are switched to nonconducting. To activate the following station, the first switch 82 of the predecessor is now switched to conducting. For example, if the first station 11 activates the second station 12, then the first switch 82 of the first station 11 is switched to conducting. Therefore a current flows through the second signal line 18. The current flows from the supply voltage terminal 93 via the switchable current source 91 which is switched to conducting, the first switch 82 which is also switched to conducting and the first current sensor 81 to the reference potential terminal 44. A supply voltage Vpow can be tapped at the supply voltage terminal 93. The current sensor 92 of the second station 12 detects the current flow and delivers the current detection signal S4 to the processor core 16 of the second station 12. Therefore the second station 12 is activated. The second current sensor 92 detects the current flow by the fact that the voltage drop across the current source circuit 95 and the current source resistor 96 exceeds a threshold value. The second current sensors 92 of the additional stations 11 do not detect a current flow. The activation takes place in the reverse direction.

Similarly, the coordinator 13 can activate the first station 11, and the second station 12 can activate the third station 61 in the forward direction.

However, in the operating phase B or the restart phase W the first station 11 can be activated by the second station 12. In doing so all switchable current sources 91 of all stations 11, 12 are switched to nonconducting by a command from the coordinator 13. The second switches 94 of all stations 11, 12 are thus switched to nonconducting. However, the first switches 82 of all stations 11, 12 are switched to conducting. If the switchable current source 91 of the second station 12 is then switched to conducting on the basis of a command from the coordinator 13, then only the first current sensor 81 of the first station 11 detects a current flow. The current flows from the supply voltage terminal 93 to the reference potential terminal 44 via the switchable current source 91, which is switched to conducting, the first switch 82 which is also switched to conducting and the first current sensor 81. The first current sensors 81 of the additional stations 12 do not detect a current flow. Thus only one station namely the first station 11 is activated by the second station 12. This activation takes place in the reverse direction.

FIG. 4 shows an example of an embodiment of two stations 11, 12 of the bus configuration 10 connected to the select line, which is the second signal line 18 here, and bilateral measurement and testing unit 32, 33'. The connection is switched to active according to FIG. 2G. The first and second switches 82, 94 are switched to conducting. The activation takes place in the reverse direction. In activation the station known to the coordinator 13, namely the second station 12 here, activates the unknown station, which is the first station 11 here. Accordingly, the third station 61 can also activate the second station 12 in the reverse direction.

The second signal line 18 is designed to be bidirectional. The first station 11 and the second station 12 are implemented in such a way that they can activate each other mutually via the second signal line 18.

In an alternative embodiment (not shown here), the current sink resistor 84 is omitted and replaced by a line. The two inputs of the comparator 85 are thus connected to the two terminals of the current sink 83.

Alternatively, the current sink 83 can be omitted and replaced by a line. The two inputs of the comparator 85 are then connected to the two terminals of the current sink resistor 84.

In an alternative embodiment (not shown), the current source resistor 96 has been omitted and replaced by a line. Thus the two inputs of the second comparator 100 are connected to the two terminals of the current source circuit 95.

Alternatively, the current source circuit 95 can be omitted and replaced by a line. Thus the two inputs of the second comparator 100 are connected to the two terminals of the current source resistor 96.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The following is a list of reference numerals used herein:
10 Bus configuration
11 First station
12 Second station
13 Coordinator
14 Bus
15, 16 Processor core
17 First signal line
18 Second signal line
19 Third signal line
20 Processor core
21 At least one bus line
22 Additional bus line
24, 25, 26 Transceiver
27 Supply line
28 Voltage supply
29, 30 Voltage supply
31, 32, 33 Signal output circuit
32', 33' Signal input circuit
34 Microcontroller
35, 36 Application device
42 Reference potential line
44 Reference potential terminal
45, 46, 47 Integrated circuit
49 Switch
50 Oscillator
51 Additional memory
52 Volatile memory
53 Nonvolatile memory
54 First volatile memory
55 First nonvolatile memory
56 Second volatile memory
57 Second nonvolatile memory
58 Additional transceiver
59 Additional bus terminal
60 Field bus
61 Third station
62 Fourth station
63 Fourth signal line
81 First current sensor
82 First switch
83 Current sink
84 Current sink resistor
85 First comparator
91 Switchable current source
92 Second current sensor
93 Supply voltage terminal
94 Second switch
95 Current source circuit
96 Current source resistor
97 Diode
98 Inverter
99 Voltage limiter
100 Second comparator
A Deactivation phase
B, B', B" Operating phase
K Configuration phase
S1-S4 Signal
t Time
Vpow Supply voltage
W, W' Restart phase

The invention claimed is:

1. A bus arrangement comprising:
a coordinator;
a first subscriber;
a second subscriber; and
a bus comprising:
  a first signal line coupling the first subscriber and the coordinator;
  a second signal line connecting the second subscriber to the first subscriber; and
  at least one bus line connecting the coordinator to the first subscriber and the second subscriber,
wherein the coordinator is configured to send a message via the at least one bus line to the second subscriber with a command to activate the first subscriber via the second signal line,
wherein the first subscriber comprises a first current sensor and the second subscriber comprises a switchable current source, and
wherein the second signal line couples the first current sensor with the switchable current source.

2. The bus arrangement according to claim 1, wherein the coordinator is configured to send a message to the first subscriber and the second subscriber via the at least one bus line, which contains a first subscriber address, and the first subscriber is configured to store the first subscriber address in the activated state.

3. The bus arrangement according to claim 1, wherein the coordinator is configured to activate the first subscriber in a configuration phase via the first signal line and send a message via the at least one bus line, which contains a first subscriber address, and the first subscriber is configured to store the first subscriber address.

4. The bus arrangement according to claim 1, wherein the bus arrangement comprises an additional subscriber connected to the bus between the coordinator and the first subscriber in a configuration phase, and is removed after the configuration phase, and the coordinator is configured, in a restart phase after the configuration phase, to send the message to the second subscriber via the at least one bus line with the command to activate the first subscriber via the second signal line.

5. The bus arrangement according to claim 1, wherein the first subscriber is replaced with a further first subscriber in a switch-off phase, which is between a configuration phase and a further configuration phase, and wherein the coordinator is configured to activate the further first subscriber in the further configuration phase via the first signal line and/or with the second subscriber via the second signal line.

6. The bus arrangement according to claim 1, wherein, to activate the first subscriber, the second subscriber is configured to switch the switchable current source between a conducting and a non-conducting state, and the first subscriber is configured to detect the change of a current flowing through the second line with the first current sensor.

7. The bus arrangement according to claim 1, wherein the first subscriber comprises a first switch arranged in series to the first current sensor, and the second subscriber comprises a second current sensor coupled to the switchable current source, wherein the second current sensor is configured to detect the current flowing through the second signal line.

8. The bus arrangement according to claim 3, wherein the first subscriber is configured to activate the second subscriber in a configuration phase via the second signal line, the coordinator is configured to send a message via the at least one bus line, which contains a second subscriber address, and the second subscriber is configured to store the second subscriber address.

9. The bus arrangement according to claim 5, wherein the coordinator comprises a switch and is configured to perform the further configuration phase after actuating the switch.

10. The bus arrangement according to claim 7, wherein, to activate the second subscriber, the first subscriber is configured to switch the first switch between a conducting and a non-conducting state, and the second subscriber is configured to detect the change of a current flowing through the second line by using the second current sensor.

11. A method of operating a bus assembly, the method comprising:
sending a message from a coordinator via at least one bus line to a second subscriber with a command that the second subscriber activate a first subscriber via a second signal line, wherein a bus comprises:
a first signal line, which couples the first subscriber and the coordinator; and
the second signal line, which connects the second subscriber to the first subscriber; and
the at least one bus line, which connects the coordinator with the first subscriber and the second subscriber,
wherein the first subscriber comprises a first current sensor and the second subscriber comprises a switchable current source, and
wherein the second signal line couples the first current sensor to the switchable current source.

* * * * *